United States Patent

[11] 3,555,176

[72] Inventor Gildo Cecchin
Niles, Ill.
[21] Appl. No. 733,336
[22] Filed May 31, 1968
[45] Patented Jan. 12, 1971
[73] Assignee Motorola, Inc.
Franklin Park, Ill.
a corporation of Illinois

[54] COLOR DEMODULATOR
8 Claims, 8 Drawing Figs.

[52] U.S. Cl. .......... 178/5.4
[51] Int. Cl. .......... H04n 9/50
[50] Field of Search .......... 178/5.4, 5.4SD; 329/50

[56] References Cited
UNITED STATES PATENTS
3,133,987 5/1964 Palladino .......... 178/5.4(SD)

*Primary Examiner*—Richard Murray
*Attorney*—Mueller and Aichele

ABSTRACT: A color demodulator for a color television receiver uses three separate demodulators each having a pair of diodes to separately demodulate the three color signals. The polarity of the pair of diodes used to demodulate one color is reversed from the polarity of the diodes used the other two colors in order to provide the proper phase angles necessary to carry out the demodulation.

INVENTOR
GILDO CECCHIN
BY Mueller, Aichele & Rauner
ATTYS.

INVENTOR
GILDO CECCHIN
BY Mueller, Aichele & Rauner
ATTYS.

INVENTOR
GILDO CECCHIN
BY Mueller, Aichele & Rauner
ATTYS.

COLOR DEMODULATOR

BACKGROUND OF THE INVENTION

In a color television receiver it is necessary to demodulate the color television signal or chrominance signal in order to provide three separate chroma signals representing the three colors used in a tricolor system. This is accomplished by mixing a reference signal with the chrominance signal to provide the demodulation. By using three separate reference signals, differing only in their phase, the three chroma signals representing the three colors can be obtained.

In order to accomplish the demodulation it is normally the practice to use two demodulators and to shift the phase of the reference signal to develop a second reference signal. One reference signal is combined with the chrominance signal in one demodulator to produce one chroma signal. The second reference signal is combined with the chrominance signal in a second demodulator to produce the second chroma signal. To produce the third color the first two colors obtained may be matrixed with the brightness signal.

In another form of color demodulator the third color is obtained by developing a third reference signal having a third phase angle and combining it with the chrominance signal in a third demodulator. However, when three reference signals are used at least one must be shifted in phase by more than 90° so that phase shifters using simple RLC networks are not feasible. In a common form of color demodulator circuit the phase of the reference signal is chosen so that to obtain the third reference signal the phase of one reference signal is shifted 180° by means of a transformer, which is an extra expensive component.

It is, therefore, an object of this invention to provide an improved color demodulator in which demodulation of the chrominance signal to develop three separate chroma signals is obtained without the use of a matrixing circuit.

Another object of this invention is to provide a color demodulator in which demodulation of the chrominance signal to three separate chroma signals developed is obtained without the use of a transformer for phase shifting the reference signal.

In practicing this invention three diode demodulators are provided each having a pair of diodes therein. A chrominance signal is coupled in push-pull to each of the diode demodulators so that the phase of the chrominance signal applied to each demodulator is the same. A reference signal having a phase relationship to the chrominance signal, opposite to that required to demodulate one of the three chroma signals is also provided. The reference signal is shifted in phase and coupled to one demodulator, shifted in phase by a different amount and coupled to a second demodulator and is coupled to the third demodulator with its phase unchanged. The diodes of the third demodulator have their polarity reversed from the diodes of the first two demodulators. The reversal of the polarity of the diodes in the third demodulator provides the same effect as if the reference signal applied to that demodulator was reversed in phase by 180°.

The invention is illustrated in the drawings in which.

DESCRIPTION OF THE INVENTION

Figure 1:
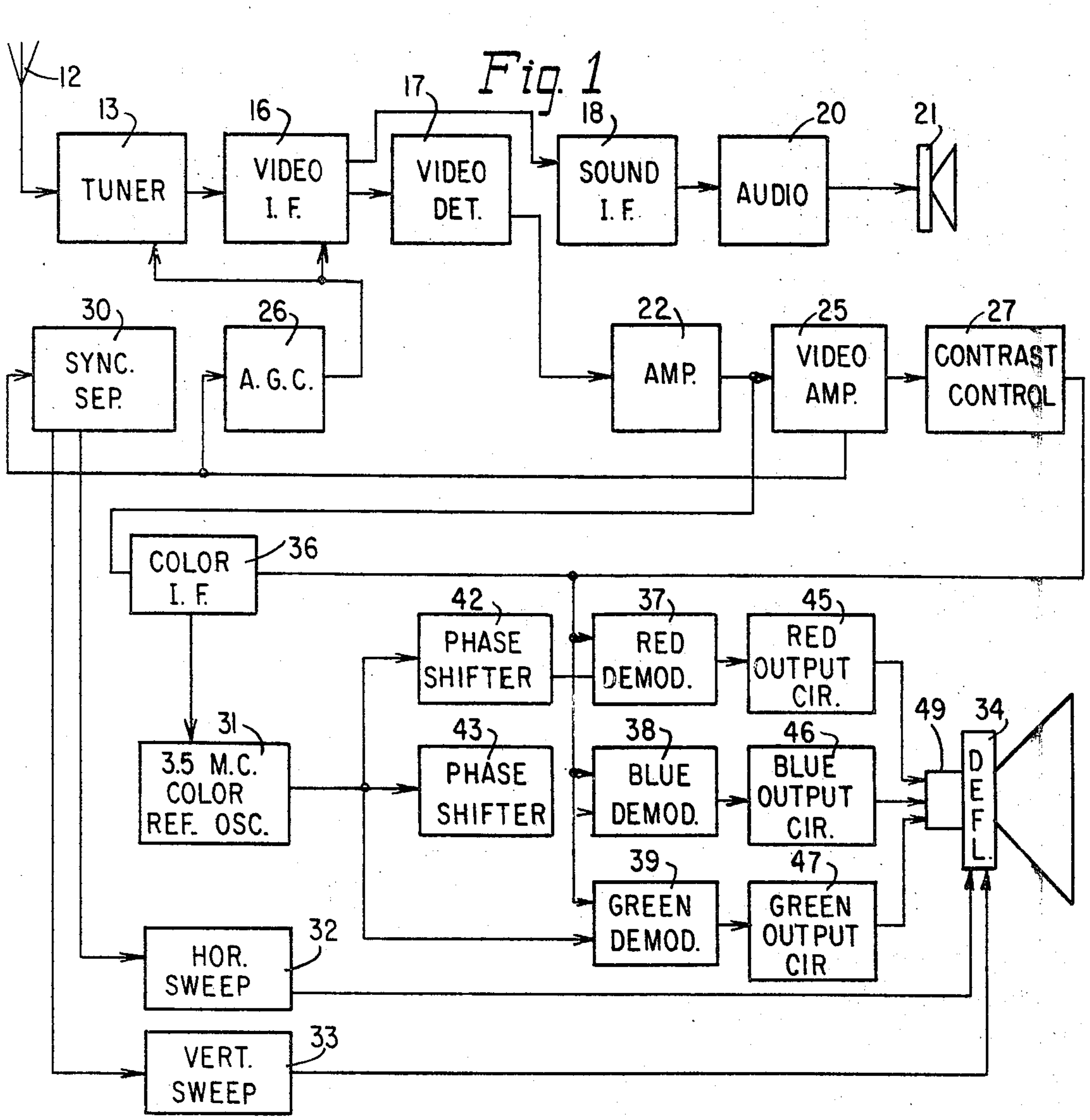
FIG. 1 is a block diagram of a color television receiver incorporating the demodulator of this invention.

Referring to FIG. 1 there is shown a block diagram of a color television receiver. Signals received on antenna 12 are detected in tuner 13 and amplified in video IF amplifier 16. Video signals are coupled from video IF amplifier 16 to video detector 17 and sound signals are coupled from video IF amplifier 16 to sound IF 18. Sound signals are amplified in audio amplifier 20 and reproduced by speaker 21.

Video signals from video detector 17 are amplified in amplifier 22 and video amplifier 25 and coupled to contrast control 27. The output of video amplifier 25 is coupled to the sync separator 30 and AGC circuit 26. The output of AGC circuit 26 is coupled back to tuner 13 and video IF 16 to provide the desired AGC action for the receiver. The outputs of sync separator 30 are horizontal and vertical sync signals. The horizontal sync signal is coupled to the horizontal sweep circuit 32 and the vertical sweep signal is coupled to the vertical sweep circuit 33. The color reference burst is coupled to the 3.5 mc. color reference oscillator 31 from circuit 36. The outputs of the horizontal sweep circuit 32 and vertical sweep circuit 33 are coupled to the deflection coils 34 of cathode ray tube 49.

The chrominance signal is coupled from amplifier 22 through color IF amplifier 36 to the red demodulator 37, blue demodulator 38 and green demodulator 39. Also, the brightness signal from contrast control circuit 27 is coupled to each of the red, blue an green demodulators. The output of the 3.5 megacycle color reference oscillator 31 is coupled directly to green demodulator 39 and to phase shifters 42 and 43. The output of phase shifter 42 is coupled to the red demodulator 37 and the output of phase shifter 43 is coupled to the blue demodulator 38. Thus each of the three demodulators receives a chrominance signal, a brightness signal and a reference signal with the reference signals applied to each demodulator being shifted in phase relative to each other.

By employing a proper amount of phase shift in phase shifter 42, the output of the red demodulator 37 is the R-Y signal plus the brightness of Y signal from contrast control 27. The R-Y signal is added to the Y signal at the output of the red demodulator to give the red signal.

The phase shift of the phase shifter 43 is chosen so that the output of blue demodulator 38 is the B-Y signal plus the Y signal from contrast control 27 or the blue signal. The reference oscillator signal is fed directly to the green demodulator 39 where it mixes with the color signal and the brightness signal to develop the green signal in a manner to be described. The red, blue and green signals are amplified in output circuits 45, 46 and 47 respectively and coupled from there to the cathode ray tube 49 for reproduction as a color picture.

Figure 2:
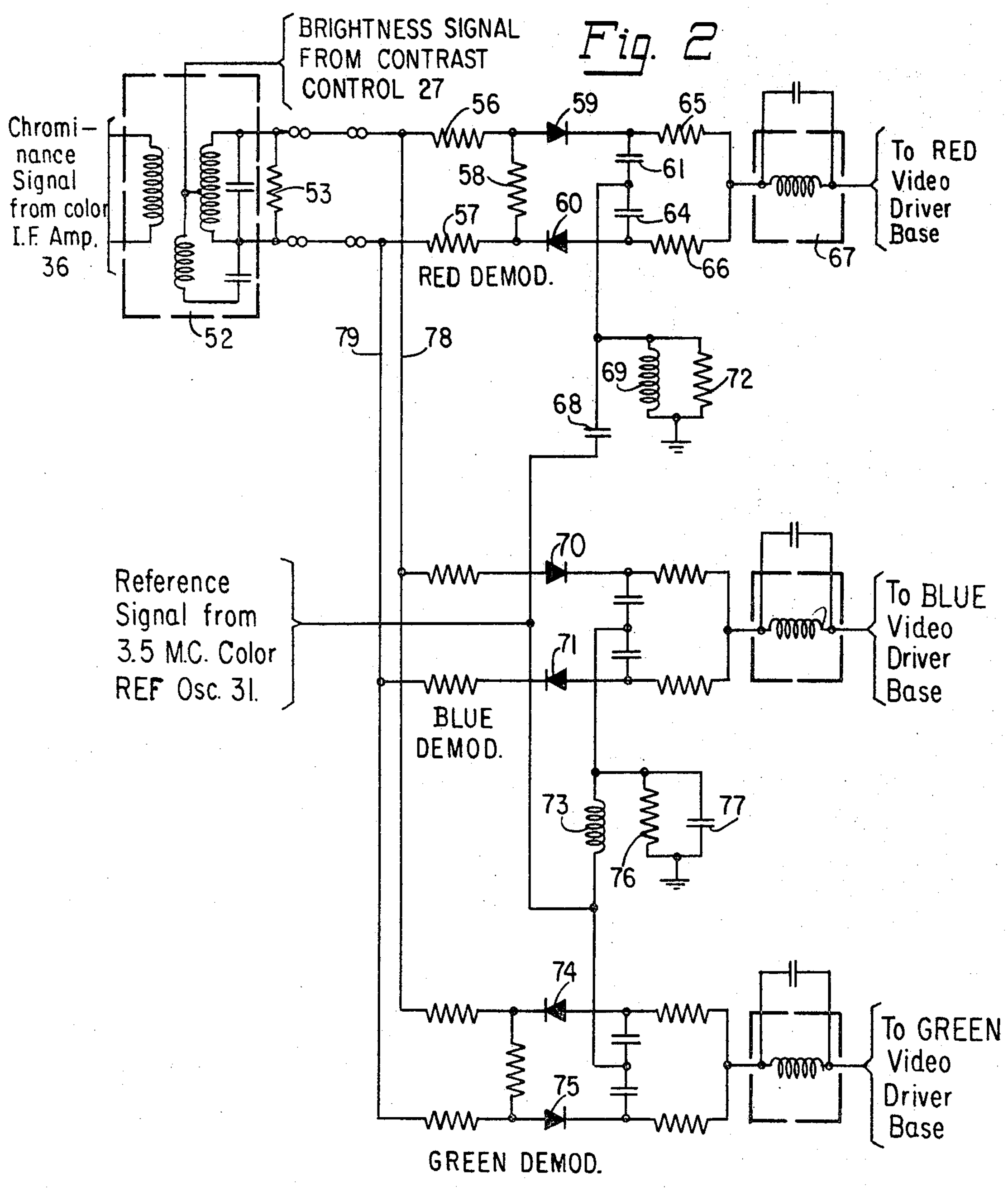
FIG. 2 is a schematic showing the demodulator of this invention.

Referring to FIG. 2 the chrominance signal from color IF amplifier 36 is coupled to circuit 52 and developed across resistor 53. The brightness signal from contrast control 27 is also coupled through coupling circuit 52 to each of the demodulators. The red demodulator includes resistors 56, 57 and 58 coupling the chrominance signal to diodes 59 and 60 in push-pull. The chroma or demodulated color signal is coupled from diodes 59 and 60, through resistors 65 and 66, to the 3.58 megacycle trap 67. The reference signal is coupled from the reference signal oscillator through a phase shifting network consisting of capacitor 68, inductance 69 and resistor 72, to the demodulator diodes through capacitors 61 and 64.

The blue demodulator is substantially the same as the red demodulator and includes diodes 70 and 71. The reference signal is coupled to the blue demodulator through the phase shifting network consisting of inductance 73, resistance 76 and capacitance 77. The green demodulator is substantially the same as the red and blue demodulators and includes diodes 74 and 75. The reference signal is coupled directly to the green demodulator.

While the green demodulator is substantially the same as the red and blue demodulators, there is one difference in that the polarity of diode 74 is opposite to the polarity of diodes 59 and 70 while the polarity of diode 75 is opposite to diodes 60 and 71, Thus the chrominance signal on line 78 is coupled to the anode of diodes 59 and 70 and to the cathode of diode 74 while the chrominance signal on line 79 is coupled to the cathodes of diodes 60 and 71 and to the anode of diode 75. Thus the diodes in the green demodulator have their polarity reversed from the diodes in the red and blue demodulators.

The reference signal applied to the two diodes switches them at a 7.2 mc. rate (approximate) with respect to the brightness signal so that the diodes appear as a low impedance path to the brightness signal. The brightness signal appearing across the output resistors 65 and 66 combines with the chroma signal there (at this point the R-Y signal) to develop the red chroma signal the blue and green demodulators operate in a similar manner.

Figure 3:
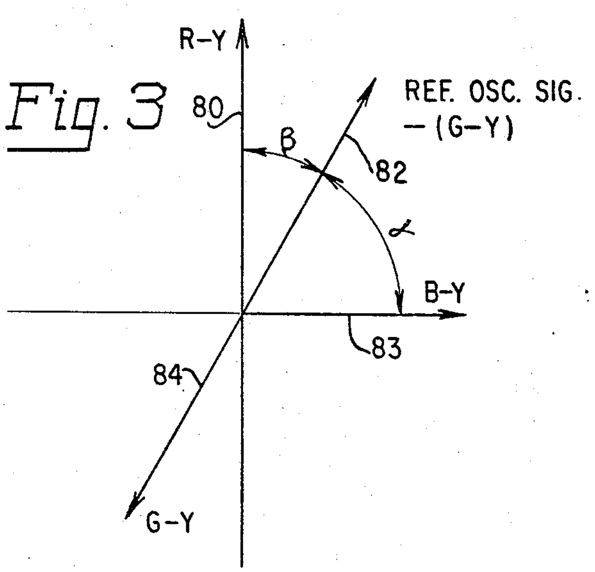
FIG. 3 is a phasor diagram illustrating the operation of the circuit of FIG. 2.

Referring to FIG. 3 there is shown a phasor diagram of the signals in the demodulators. By mixing the chrominance signal with a color reference signal of the proper frequency and phase, it is possible to demodulate the particular chroma signal desired from the chrominance signal. Thus to obtain the R-Y signal shown as 80 in FIG. 3, a color reference signal in phase with the R-Y phasor should be applied to the red demodulator. Likewise to obtain the B-Y signal from the blue demodulator a reference signal in phase with the B-Y phasor 83 should be coupled to the blue demodulator. The green demodulator should receive a reference signal in phase with the G-Y phasor 84. Thus it is necessary to develop three different reference signals, each having the same frequency but having different phase angles.

The reference signal can be developed by the 3.58 mc. oscillator at any convenient phase angle and can then be shifted to the desired phase angles by means of phase shifting networks. However, it is difficult to obtain phase shifting networks which are simple in operation and inexpensive which develop large phase shifts. For example, if the reference signal were chosen to be in phase with the R-Y phasor 80, a phase shift of approximately 90° would be required for the B-Y signal and a phase shift very much greater than 90° would be required for the G-Y signal. A phase shift of 90° is difficult to obtain while the much larger phase shift for the G-Y signal would be more difficult. It can be seen that no matter where the initial phase angle of the reference signal is selected, with regard to the phasors 80, 83 and 84, a large phase shift would be required for at least one of the reference signals.

Prior art circuits have overcome this difficulty by using a reference signal having a phase between the two of the phasors, for example, a reference signal having the phase angle represented by phasor 82 which lies between phasors 80 and 83. The phase shifts required, $\alpha$ and $\beta$, are easily obtainable with conventional simple RLC phase shifting networks. To obtain the G-Y signal, represented by phasor 84, the R-Y and B-Y signals are matrixed with the Y signal, or if the phase angle of the initial reference signal 82 is on the −(G-Y) axis, a 180° phase reversal is obtained by using a transformer. Both of these methods of obtaining the G-Y signal are expensive and relatively difficult to carry out.

In the circuit of FIG. 2 the initial reference signal is chosen to lie along the −(G-Y) axis as shown by phasor 82 of FIG. 3. A phase-shifting network consisting of capacitor 68, inductance 69 and resistor 72 produces a phase shift $\beta$ so that the reference signal applied to the red demodulator is in phase with phasor 80 to develop the R-Y signal. Likewise the phase shifting network consisting of inductance 73, resistor 76 and capacitor 77 produces the phase shift $\alpha$ to develop the reference signal which is applied to the blue demodulator and which is in phase with phasor 83. The initial reference signal is then applied directly to the green demodulator without phase shift. By reversing the polarity of the diodes 74 and 75 of the green demodulator, the same effect is obtained as if the initial reference signal were shifted 180° in phase and applied to a demodulator having diodes poled as in the red and blue demodulator. The output of the green demodulator is the G-Y signal represented by phasor 84. Thus by a simple reversal of the diodes of the demodulator demodulating one of the three colors, the three colors used in the color television system are obtained without expensive and complicated matrixing or transformer circuits.

Figures 4, 5, 6, 7, 8:
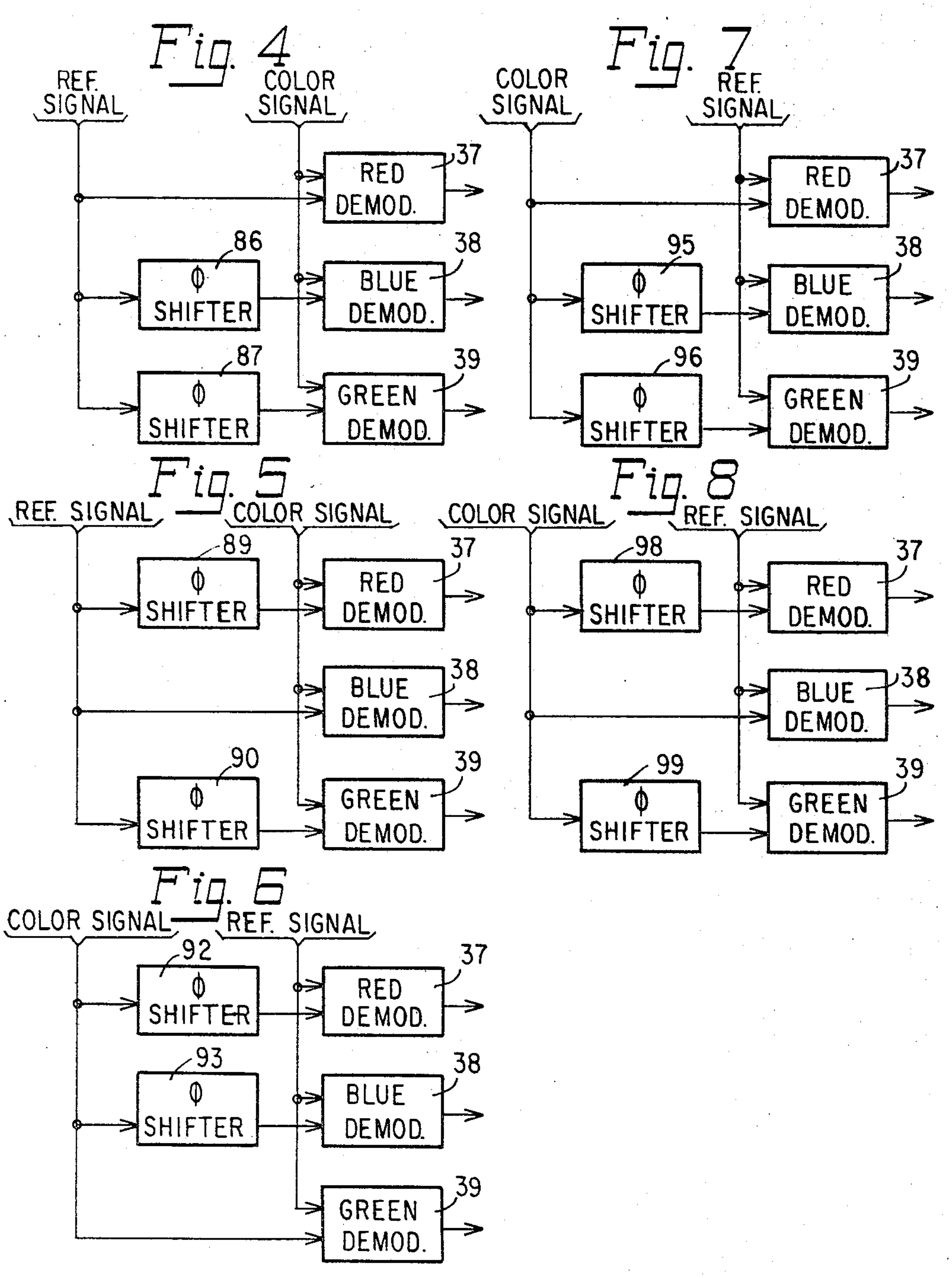
FIGS. 4—8 are block diagrams illustrating alternate arrangements of the demodulator circuit.

While the example described reverses the diodes in the green demodulator, the invention is not limited to this form. For example, as shown in FIG. 4, the initial reference signal can be chosen to lie along the −(R-Y) axis and the diodes in the red demodulator 37 reversed in polarity. In this case the phase shifters 86, 87 would shift the phase of the initial reference signal applied to the blue and green demodulators 38 and 39. In FIG. 5 the polarity of the diodes of the blue demodulator 38 are reversed while the initial reference signal is in phase with the −(B-Y) signal. The phase angle of the reference signals applied to the red demodulator 37 and green demodulator 39 are shifted in phase by phase shifters 89 and 90. In the previous examples the initial reference signal has been phase shifted in order to develop the proper chroma signals. However, the chrominance signal applied to the demodulators can be phase shifted instead of the reference signal. For example, in FIGS. 6, 7 and 8 the reference signal is applied directly to each of the red, blue and green demodulators 37, 38 and 39 without phase shift. In FIG. 6 the chrominance signal is phase shifted by phase shifter 92 and applied to red demodulator 37 and also phase shifted by phase shifter 93 and applied to the blue demodulator 38. The chrominance signal is applied directly to the green demodulator 39 and the diodes of the green demodulator 39 are reversed in polarity. The reference signal would be in phase with the (G-Y) signal.

In FIG. 7 the reference signal would be in phase with the (R-Y) signal and would be coupled directly to the red demodulator 37, blue demodulator 38 and the green demodulator 39. The chrominance signal is then coupled directly to the red demodulator 37 and to the blue demodulator 38 through phase shifter 95 and the green demodulator 39 through phase shifter 36. The diodes in the red demodulator 37 are reversed in polarity with respect to the diodes in the blue and green demodulators 38, 39.

In FIG. 8 the reference signal is in phase with the (B-Y) phasor and is applied directly to each of the three demodulators 37, 38 and 39. The chrominance signal is applied through phase shifter 98 to red demodulator 37 and through phase shifter 99 to green demodulator 39. The color signal is applied directly to the blue demodulator 38 without shift and the diodes of the blue demodulator 38 are reversed in polarity with respect to the diodes in the red and green demodulators. Thus it can be seen that any combination desired may be used to develop the chroma signals. In normal practice the color reference signal is shifted in phase since it is a signal of constant amplitude and frequency and thus a more simple phase shifting network can be used than would be the case with the chrominance signal.

Thus a simple demodulation circuit for a color television receiver has been shown. The circuit eliminates the need for complex and relatively costly matrixing or transformer circuits and requires no additional components to achieve the desired demodulation.

I claim:

1. A demodulator circuit for a color television receiver including in combination, chrominance signal input means adapted to receive a chrominance signal, reference signal input means adapted to receive a reference signal, first, second and third demodulator means, first phase-shifting means coupling one of said reference signal input means or said chrominance signal input means to said first demodulator means for shifting the relative phase of said reference signal and said chrominance signal by a first predetermined amount, the other signal input means being coupled directly to said first demodulator means, second phase shifting means coupling one of said reference signal input means or said chrominance signal input means to said second demodulator means for shifting the relative phase of said reference signal and said chrominance signal by a second predetermined amount, the other signal input means being coupled directly to said second demodulator means, and circuit means coupling said reference signal input means and said chrominance signal input means directly to said third demodulator means for applying said reference signal and said chrominance signal thereto, each of said first, second and third demodulator means including switching means, said switching means being so arranged that the polarity of said switching means of said third demodulator means is reversed with respect to the polarity of said switching means of said first and second demodulator means.

2. The demodulator circuit of claim 1 wherein, each of said switching means includes a pair of diodes arranged to receive said chrominance and said reference signals to demodulate said chrominance signal, the polarity of said pair of diodes in said switching means of said third demodulator means being reversed with respect to the polarity of corresponding ones of said pair of diodes in each of said switching means of said first and second demodulator means.

3. The demodulator circuit of claim 1 wherein, said chrominance signal input means includes first and second output means, with the phase of said chrominance signal appearing at said first output means being 180° from the phase of said chrominance signal appearing at said second output means, each of said demodulator switching means including a first diode coupled to said first output means and a second diode coupled to said second output means, the polarity of said first diode of said third demodulator means being reversed with respect to the polarity of said first diode in each of said first and second demodulator means, and the polarity of said second diode in said third demodulator means being reversed with respect to the polarity of said second diode in each of said first and second demodulator means.

4. The demodulator circuit of claim 3 wherein, the phase angle of the demodulated output of said third demodulator means has a particular phase angle, said reference signal applied to said third demodulator means having a phase angle 180° from said particular phase angle.

5. The demodulator circuit of claim 3 wherein, said chrominance signal has R-Y, B-Y and G-Y phase angles, said first demodulator is an R-Y demodulator, said second demodulator is a B-Y demodulator and said third demodulator is a G-Y demodulator, said reference signal having a phase angle equal to minus said G-Y phase angle, said first phase shifting means coupling said reference signal to said first demodulator means with said reference signal shifted to said R-Y phase angle, said second phase shifting means coupling said reference signal to said second demodulator means with said reference signal shifted to said B-Y phase angle, the amount of said first and second predetermined amounts of phase shift each being less than 90°.

6. The demodulator circuit of claim 5 wherein, said chrominance signal input means is further adapted to receive a brightness signal, and couple the same to said first, second and third demodulator means, each of said demodulator means including demodulator output impedance means, said brightness signal combining with said demodulated chrominance signals across said output impedance means of said first, second and third demodulators to develop red, blue and green chroma signals respectively.

7. A demodulator circuit for a color television receiver including in combination, chrominance signal input means adapted to receive a chrominance signal, reference signal input means adapted to receive a reference signal, first, second and third demodulator means each coupled to said reference signal input means, first phase shifting means coupling said chrominance signal input means to said first demodulator means for shifting the phase of said chrominance signal by a first predetermined amount, second phase shifting means coupling said chrominance signal input means to said second demodulator means for shifting the phase of said chrominance signal by a second predetermined amount, and circuit means coupling said chrominance signal input means directly to said third demodulator means for applying said chrominance signal thereto, each of said first, second and third demodulator means including diode means, said diode means being so arranged that the polarity of said diode means of said third demodulator means is reversed with respect to the polarity of corresponding ones of said diode means of said first and second demodulator means.

8. The demodulator circuit of claim 7 wherein, each of said switching means includes a pair of diodes arranged to receive said chrominance and said reference signals to demodulate said chrominance signal, the polarity of said pair of diodes in said switching means of said third demodulator means being reversed with respect to the polarity of corresponding ones of said pair of diodes in each of said switching means of said first and second demodulator means.